(12) United States Patent
Kulankara

(10) Patent No.: US 10,955,179 B2
(45) Date of Patent: Mar. 23, 2021

(54) REDISTRIBUTING REFRIGERANT BETWEEN AN EVAPORATOR AND A CONDENSER OF A VAPOR COMPRESSION SYSTEM

(71) Applicant: Johnson Controls Technology Company, Auburn Hills, MI (US)

(72) Inventor: Satheesh Kulankara, York, PA (US)

(73) Assignee: Johnson Controls Technology Company, Auburn Hills, MI (US)

( * ) Notice: Subject to any disclaimer, the term of this patent is extended or adjusted under 35 U.S.C. 154(b) by 274 days.

(21) Appl. No.: 16/225,865

(22) Filed: Dec. 19, 2018

(65) Prior Publication Data

US 2019/0203999 A1    Jul. 4, 2019

Related U.S. Application Data

(60) Provisional application No. 62/611,769, filed on Dec. 29, 2017.

(51) Int. Cl.
*F25B 49/02* (2006.01)
*F25B 41/04* (2006.01)
(Continued)

(52) U.S. Cl.
CPC ............ *F25B 49/027* (2013.01); *F25B 41/04* (2013.01); *F25B 41/062* (2013.01); *F25B 45/00* (2013.01);
(Continued)

(58) Field of Classification Search
CPC .................. F25B 49/027; F25B 2600/2513
See application file for complete search history.

(56) References Cited

U.S. PATENT DOCUMENTS

| 4,832,068 A | 5/1989 | Wendschlag et al. |
| 5,209,080 A | 5/1993 | Zinsmeyer |

(Continued)

FOREIGN PATENT DOCUMENTS

| EP | 3130870 A1 | 2/2017 |
| JP | 2001147048 A | 5/2001 |
| WO | 2008002048 A1 | 1/2008 |

OTHER PUBLICATIONS

International Search Report and Written Opinion for PCT Application No. PCT/US2018/067697 dated Mar. 20, 2019, 14 pgs.

*Primary Examiner* — Jonathan Bradford
(74) *Attorney, Agent, or Firm* — Fletcher Yoder, P.C.

(57) ABSTRACT

A heating, ventilation, and air conditioning (HVAC) system includes an expansion device disposed between a condenser and an evaporator of a vapor compression system and a control panel communicatively coupled to the expansion device. The control panel is configured to: determine a liquid refrigerant level set point of the condenser based on parameters of the vapor compression system, provide a first control signal to increase an opening of the expansion device in response determining that the current liquid refrigerant level in the condenser is greater than a determined liquid refrigerant level set point of the condenser, and provide a second control signal to decrease the opening of the expansion device in response to determining that the current liquid refrigerant level in the condenser is less than the determined liquid refrigerant level set point of the condenser.

20 Claims, 6 Drawing Sheets

(51) Int. Cl.
*F25B 41/06* (2006.01)
*F25B 45/00* (2006.01)
*F25B 25/00* (2006.01)

(52) U.S. Cl.
CPC ............ *F25B 49/02* (2013.01); *F25B 25/005* (2013.01); *F25B 2339/024* (2013.01); *F25B 2339/04* (2013.01); *F25B 2339/046* (2013.01); *F25B 2339/047* (2013.01); *F25B 2500/18* (2013.01); *F25B 2500/23* (2013.01); *F25B 2500/24* (2013.01); *F25B 2600/2513* (2013.01); *F25B 2700/04* (2013.01); *F25B 2700/195* (2013.01); *F25B 2700/1931* (2013.01); *F25B 2700/21152* (2013.01); *F25B 2700/21163* (2013.01); *F25B 2700/21175* (2013.01)

(56) References Cited

U.S. PATENT DOCUMENTS

| | | |
|---|---|---|
| 5,495,720 A | 3/1996 | Buck |
| 5,655,379 A | 8/1997 | Jaster et al. |
| 5,687,578 A | 11/1997 | Cochran |
| 5,752,390 A | 5/1998 | Hyde |
| 5,778,695 A * | 7/1998 | Ring .................... F25B 41/065 340/622 |
| 5,782,131 A | 7/1998 | Lord et al. |
| 5,809,795 A | 9/1998 | Beaverson et al. |
| 5,974,812 A | 11/1999 | Katai et al. |
| 6,035,651 A * | 3/2000 | Carey .................... F04C 28/06 62/115 |
| 6,067,807 A | 5/2000 | Reimann |
| 6,311,504 B1 | 11/2001 | Yamazaki et al. |
| 6,389,830 B2 | 5/2002 | Bottum, Sr. et al. |
| 6,935,127 B2 | 8/2005 | Jeong et al. |
| 7,111,469 B2 | 9/2006 | Horan et al. |
| 7,356,998 B2 | 4/2008 | Lee et al. |
| 7,533,536 B1 | 5/2009 | Zugibe et al. |
| 7,650,759 B2 | 1/2010 | Park et al. |
| 7,775,057 B2 * | 8/2010 | VanderZee ............. F25B 49/02 62/222 |
| 7,784,295 B2 | 8/2010 | McCormick et al. |
| 8,205,465 B2 | 6/2012 | Huerta-Ochoa |
| 8,393,169 B2 | 3/2013 | Pham |
| 8,459,052 B2 | 6/2013 | Bush et al. |
| 8,578,722 B2 | 11/2013 | Jakobsen et al. |
| 9,207,007 B1 | 12/2015 | Mowris |
| 9,217,592 B2 | 12/2015 | Turney et al. |
| 9,222,712 B1 | 12/2015 | Zugibe et al. |
| 9,261,542 B1 | 2/2016 | West |
| 9,297,565 B2 | 3/2016 | Hung |
| 9,303,901 B2 | 4/2016 | Thybo et al. |
| 9,303,909 B2 | 4/2016 | Kolarich |
| 9,347,715 B2 | 5/2016 | Schreiber et al. |
| 9,423,165 B2 | 8/2016 | Zugibe et al. |
| 9,459,032 B2 | 10/2016 | Nishimura et al. |
| 9,506,678 B2 | 11/2016 | Uselton |
| 9,523,523 B2 | 12/2016 | Sibik et al. |
| 9,568,206 B2 | 2/2017 | Tutunoglu |
| 9,568,226 B2 | 2/2017 | Schuster et al. |
| 9,587,865 B2 | 3/2017 | Jeong et al. |
| 2006/0059926 A1 | 3/2006 | McCormick et al. |
| 2008/0307810 A1 * | 12/2008 | VanderZee ............. F25B 49/02 62/222 |
| 2011/0056664 A1 * | 3/2011 | De Larminat ........ F25B 39/028 165/160 |
| 2011/0197601 A1 | 8/2011 | Booth et al. |
| 2015/0345846 A1 * | 12/2015 | Kopko .................... F25B 49/02 62/115 |
| 2015/0354873 A1 * | 12/2015 | Hartfield ............... F25B 31/004 62/119 |
| 2015/0377527 A1 | 12/2015 | Christians et al. |

* cited by examiner

REDISTRIBUTING REFRIGERANT BETWEEN AN EVAPORATOR AND A CONDENSER OF A VAPOR COMPRESSION SYSTEM

CROSS-REFERENCE TO RELATED APPLICATIONS

This application is claims priority to and the benefit of U.S. Provisional Application Ser. No. 62/611,769, filed Dec. 29, 2017, entitled "REDISTRIBUTING REFRIGERANT BETWEEN AN EVAPORATOR AND A CONDENSER OF A VAPOR COMPRESSION SYSTEM," which is herein incorporated by reference in its entirety for all purposes.

BACKGROUND

This application relates generally to chiller systems, and, more specifically, to redistributing refrigerant charge in a vapor compression system to improve efficiency and reliability.

Chiller systems and other types of vapor compression systems utilize a working fluid, typically referred to as a refrigerant, which changes phases between vapor, liquid, and combinations thereof, in response to being subjected to different temperatures and pressures associated with operation of the vapor compression system. Within a water-cooled chiller system, the refrigerant is vaporized by relatively warm water traversing conduits (e.g., boiling tubes) that extend through the evaporator, and the refrigerant is condensed by a coolant traversing conduits (e.g., condensing tubes) that extend through the condenser. In traditional chiller designs, the liquid refrigerant level in the condenser is controlled to a fixed value, while the liquid refrigerant level in the remainder of the vapor compression system (e.g., the evaporator) generally fluctuates based on this fixed liquid refrigerant level in the condenser.

SUMMARY

In one embodiment of the present disclosure, a heating, ventilation, and air conditioning (HVAC) system includes a condenser, an evaporator, and a compressor fluidly coupled together to form a vapor compression system of the HVAC system. The HVAC system includes an expansion device disposed between the condenser and the evaporator in the vapor compression system and a control panel communicatively coupled to the expansion device. The control panel is configured to: determine a liquid refrigerant level set point of the condenser based on parameters of the vapor compression system, wherein the parameters comprise a current liquid refrigerant level in the condenser; provide a first control signal to increase an opening of the expansion device in response determining that the current liquid refrigerant level in the condenser is greater than the determined liquid refrigerant level set point of the condenser; and provide a second control signal to decrease the opening of the expansion device in response to determining that the current liquid refrigerant level in the condenser is less than the determined liquid refrigerant level set point of the condenser.

In another embodiment of the present disclosure, a method of operating a vapor compression system includes determining a liquid refrigerant level set point of a condenser of the vapor compression system based on parameters of the vapor compression system, wherein the parameters comprise a current liquid refrigerant level in the condenser. The method includes providing a first control signal to increase an opening of the expansion device in response determining that the current liquid refrigerant level in the condenser is greater than the determined liquid refrigerant level set point of the condenser. The method also includes providing a second control signal to decrease the opening of the expansion device in response to determining that the current liquid refrigerant level in the condenser is less than the determined liquid refrigerant level set point of the condenser.

In another embodiment of the present disclosure, a HVAC system includes a condenser, an evaporator, and a compressor fluidly coupled together to form a vapor compression system of the HVAC system. The HVAC system includes an expansion device disposed between the condenser and the evaporator in the vapor compression system and a control panel communicatively coupled to the expansion device. The control panel is configured to: determine a liquid refrigerant level set point of the evaporator based on parameters of the vapor compression system, wherein the parameters comprise a current liquid refrigerant level in the evaporator; provide a first control signal to increase an opening of the expansion device in response determining that the current liquid refrigerant level in the evaporator is lower than the determined liquid refrigerant level set point of the evaporator; and provide a second control signal to decrease the opening of the expansion device in response to determining that the current liquid refrigerant level in the evaporator is more than the determined liquid refrigerant level set point of the evaporator.

DETAILED DESCRIPTION

Figure 1:
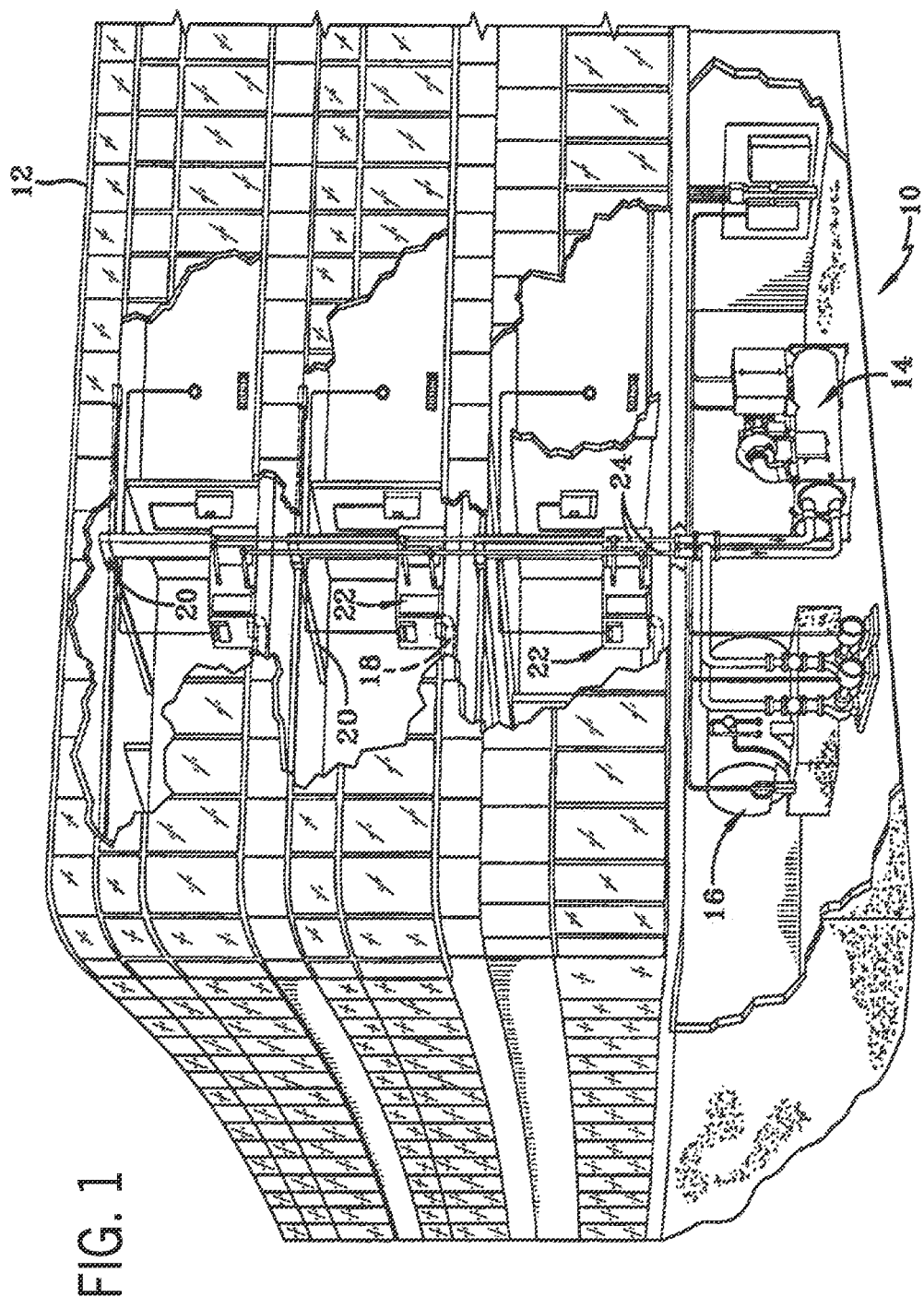
FIG. 1 is a perspective view of an embodiment of a building that may utilize a heating, ventilation, and air conditioning, (HVAC) system in a commercial setting, in accordance with an aspect of the present disclosure.

As mentioned, in many traditional chiller designs, the refrigerant level in the condenser is controlled to a predetermined fixed value. However, it is presently recognized that the efficiency of a chiller is substantially dependent on the performance of the evaporator, and that the performance of the evaporator is substantially dependent on the amount of liquid refrigerant present in the evaporator. That is, the operating conditions of the evaporator (e.g., temperature, pressure, amount of refrigerant) determine the liquid refrigerant level present in a lower portion or a flooded portion of the evaporator during chiller operation. The liquid refrigerant level in the evaporator, in turn, determines how effectively the boiling tubes of the evaporator are covered with liquid refrigerant to enable the desired heat transfer to occur. For example, when the liquid refrigerant level in the evaporator is too low, then a portion of the boiling tubes disposed in the flooded portion of the evaporator may not be effectively covered (e.g., substantially submerged) by liquid refrigerant, resulting in less than optimum performance of the evaporator and chiller. Additionally, when the liquid refrigerant level in the chiller evaporator is too high, then liquid refrigerant that has not been sufficiently vaporized may begin to "carry over" from a vapor refrigerant outlet of the evaporator, resulting in operational and reliability problems for the chiller.

Additionally, when the refrigerant level is controlled to a fixed value in the condenser, the liquid refrigerant level in the evaporator is dependent on the liquid refrigerant level in the condenser. That is, in general, as the liquid refrigerant level in the condenser decreases, the liquid refrigerant level in the evaporator increases. As such, when the liquid refrigerant level in the condenser is too high, there may not be sufficient liquid refrigerant in the evaporator to effectively cover the boiling tubes in the flooded portion of the evaporator, resulting in a decreasing in evaporator and chiller performance. Additionally, it is recognized that when the liquid refrigerant level in the condenser is too high, then the compressor may be consuming more than a minimum power requirement to cool the load. However, when the liquid refrigerant level in the condenser is too low, then refrigerant vapor may be entrained with the liquid refrigerant delivered to the evaporator, resulting in a substantial loss of efficiency for both the evaporator and the chiller. Entrainment of refrigerant vapor with the liquid refrigerant delivered to the evaporator can also result in one or more components of the chiller operating outside of normal or rated operating parameter ranges.

With the foregoing in mind, present embodiments are directed to systems and methods for continuously redistributing refrigerant charge between an evaporator and a condenser of a chiller system in order to improve chiller efficiency and reliability during operation. More specifically, present embodiments enable the continuous redistribution of liquid refrigerant between the evaporator and condenser of the chiller without resulting in substantial liquid carry over from a vapor refrigerant outlet of the evaporator or substantial gas entrainment at a liquid refrigerant outlet of the condenser. More specifically, rather than controlling the chiller to provide a fixed liquid refrigerant level in the condenser or evaporator, present embodiments are directed to controlling the chiller system to provide a variable or dynamic liquid refrigerant level in the condenser or evaporator that changes based on the operational parameters of the chiller system. By dynamically varying the amount of liquid refrigerant in the condenser, the amount of liquid refrigerant in the evaporator is also indirectly dynamically varied, substantially improving the efficiency of the chiller.

As mentioned, a liquid refrigerant level set point of the condenser or evaporator has a dynamic value that is determined by control circuitry of the chiller based on one or more parameters of the chiller system during operation. For example, the monitored parameters may include compressor power, evaporator approach temperature, liquid subcooling, discharge superheat, other suitable chiller parameters that are measured (e.g., temperature, pressure, flow rate, power) or are calculated based on a directly measured parameters of the chiller, and combinations thereof. As such, the control circuitry of the chiller system may determine and dynamically adjust the liquid refrigerant level set point of the condenser or evaporator to enable improved chiller efficiency without diminished reliability. For example, the liquid refrigerant level set point in the condenser may be adjusted to increase the efficiency of the chiller (e.g., reduce compressor power consumption) without reduced reliability as a result of liquid carry over or gas entrainment issues. In certain embodiments, the liquid refrigerant level set point may be determined by the control circuitry based on mathematical models, may be apriori based on testing various conditions, or may be based on a combination of mathematical modeling and testing.

Turning now to the drawings, FIG. 1 is a perspective view of an embodiment of an environment for a heating, ventilation, and air conditioning (HVAC) system 10 in a building 12 for a typical commercial setting. The HVAC system 10 may include a vapor compression system 14 that supplies a chilled liquid, which may be used to cool the building 12. The HVAC system 10 may also include a boiler 16 to supply warm liquid to heat the building 12 and an air distribution system which circulates air through the building 12. The air distribution system can also include an air return duct 18, an air supply duct 20, and/or an air handler 22. In some embodiments, the air handler 22 may include a heat exchanger that is connected to the boiler 16 and the vapor compression system 14 by conduits 24. The heat exchanger in the air handler 22 may receive either heated liquid from the boiler 16 or chilled liquid from the vapor compression system 14, depending on the mode of operation of the HVAC system 10. The HVAC system 10 is shown with a separate air handler on each floor of building 12, but in other embodiments, the HVAC system 10 may include air handlers 22 and/or other components that may be shared between or among floors.

Figure 2:
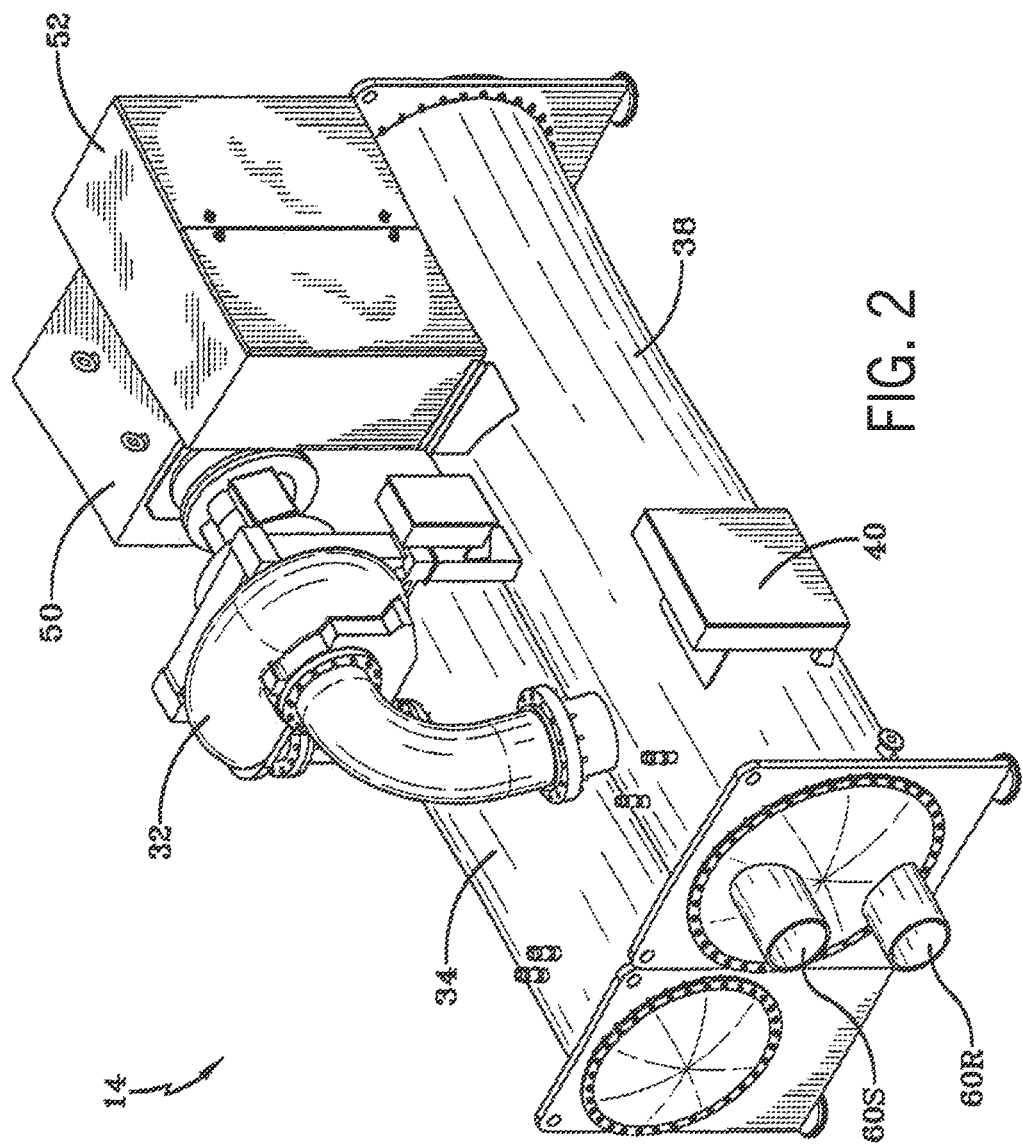
FIG. 2 is a perspective view of an embodiment of an HVAC system, in accordance with an aspect of the present disclosure.
Figure 3:
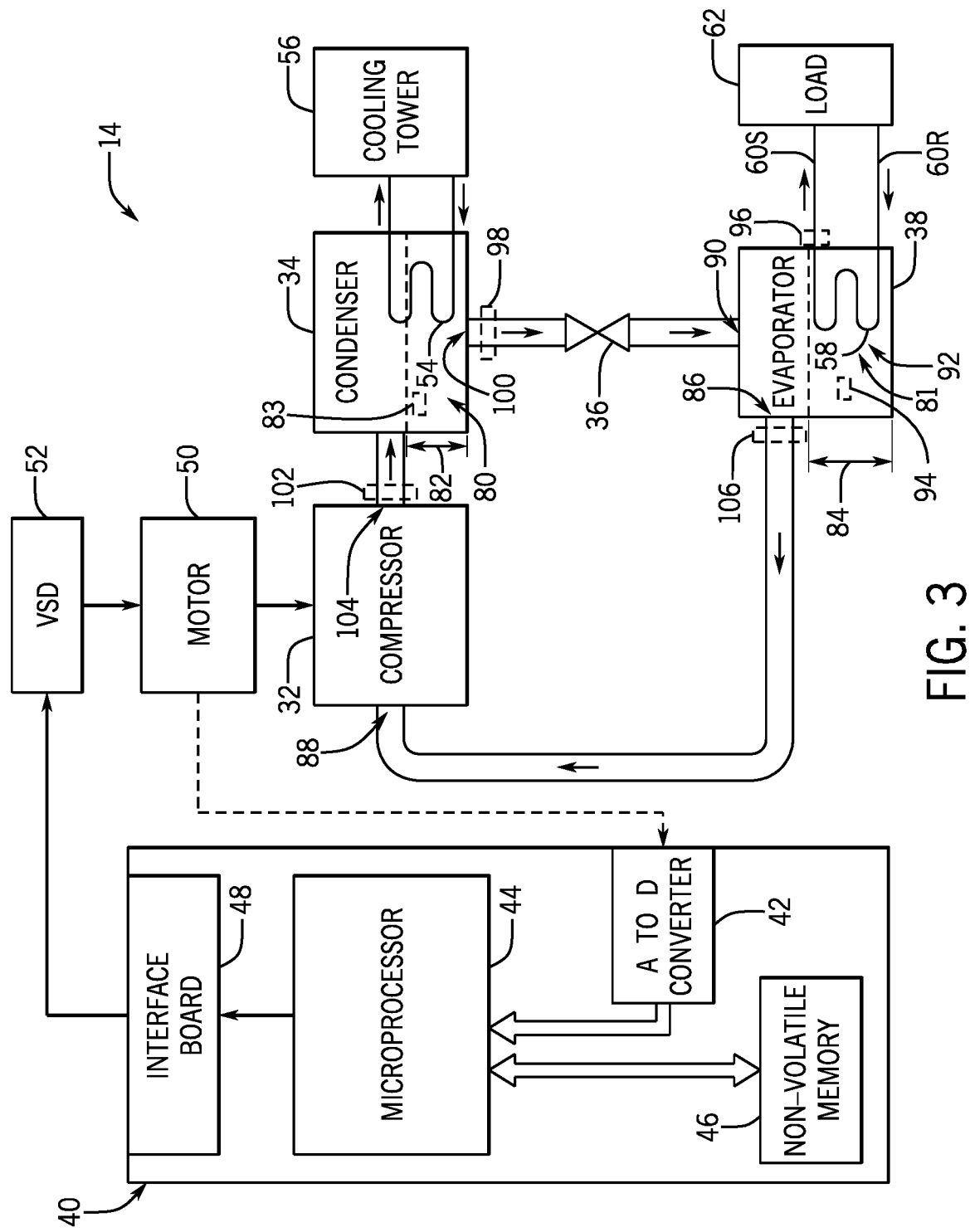
FIG. 3 is a schematic of an embodiment of the HVAC system of FIG. 2, in accordance with an aspect of the present disclosure.

FIGS. 2 and 3 are embodiments of the vapor compression system 14 that can be used in the HVAC system 10. The vapor compression system 14 may circulate a refrigerant through a circuit starting with a compressor 32. The circuit may also include a condenser 34, an expansion valve(s) or device(s) 36, and a liquid chiller or an evaporator 38. In certain embodiments, the evaporator 38 may be a falling film type evaporator (e.g., a hybrid falling film type evaporator) or a flooded type evaporator, in accordance with the present disclosure. The vapor compression system 14 may further include a control panel 40 (e.g., controller) that has an analog to digital (A/D) converter 42, a microprocessor 44, a non-volatile memory 46, and/or an interface board 48.

Some examples of fluids that may be used as refrigerants in the vapor compression system 14 are hydrofluorocarbon (HFC) based refrigerants, for example, R-410A, R-407, R-134a, hydrofluoro-olefin (HFO), "natural" refrigerants like ammonia ($NH_3$), R-717, carbon dioxide ($CO_2$), R-744, or hydrocarbon based refrigerants, water vapor, refrigerants with low global warming potential (GWP), or any other suitable refrigerant. In some embodiments, the vapor compression system 14 may be configured to efficiently utilize refrigerants having a normal boiling point of about 19 degrees Celsius (66 degrees Fahrenheit or less) at one atmosphere of pressure, also referred to as low pressure refrigerants, versus a medium pressure refrigerant, such as R-134a. As used herein, "normal boiling point" may refer to a boiling point temperature measured at one atmosphere of pressure.

In some embodiments, the vapor compression system 14 may use one or more of a variable speed drive (VSDs) 52, a motor 50, the compressor 32, the condenser 34, the expansion valve or device 36, and/or the evaporator 38. The motor 50 may drive the compressor 32 and may be powered by a variable speed drive (VSD) 52. The VSD 52 receives alternating current (AC) power having a particular fixed line voltage and fixed line frequency from an AC power source, and provides power having a variable voltage and frequency to the motor 50. In other embodiments, the motor 50 may be powered directly from an AC or direct current (DC) power source. The motor 50 may include any type of electric motor that can be powered by a VSD or directly from an AC or DC power source, such as a switched reluctance motor, an induction motor, an electronically commutated permanent magnet motor, or another suitable motor.

The compressor 32 compresses a refrigerant vapor and delivers the vapor to the condenser 34 through a discharge passage. In some embodiments, the compressor 32 may be a centrifugal compressor. The refrigerant vapor pumped by the compressor 32 to the condenser 34 may transfer heat to a cooling fluid (e.g., water or air) in the condenser 34. The refrigerant vapor may condense to a refrigerant liquid in the condenser 34 as a result of thermal heat transfer with the cooling fluid. The refrigerant liquid from the condenser 34 may flow through the expansion device 36, for the purposes of reducing the temperature and pressure of the refrigerant liquid, to the evaporator 38. In the illustrated embodiment of FIG. 3, the condenser 34 is water cooled and includes a tube bundle 54 connected to a cooling tower 56, which supplies the cooling fluid to the condenser.

The refrigerant liquid delivered to the evaporator 38 may absorb heat from another cooling fluid, which may or may not be the same cooling fluid used in the condenser 34. The refrigerant liquid in the evaporator 38 may undergo a phase change from the refrigerant liquid to a refrigerant vapor. As shown in the illustrated embodiment of FIG. 3, the evaporator 38 may include a tube bundle 58 having a supply line 60S and a return line 60R connected to a cooling load 62. The cooling fluid of the evaporator 38 (e.g., water, ethylene glycol, calcium chloride brine, sodium chloride brine, or any other suitable fluid) enters the evaporator 38 via return line 60R and exits the evaporator 38 via supply line 60S. The evaporator 38 may reduce the temperature of the cooling fluid in the tube bundle 58 via thermal heat transfer with the refrigerant. The tube bundle 58 in the evaporator 38 can include a plurality of tubes and/or a plurality of tube bundles. In any case, the refrigerant vapor exits the evaporator 38 and returns to the compressor 32 by a suction line to complete the cycle.

Figure 4:
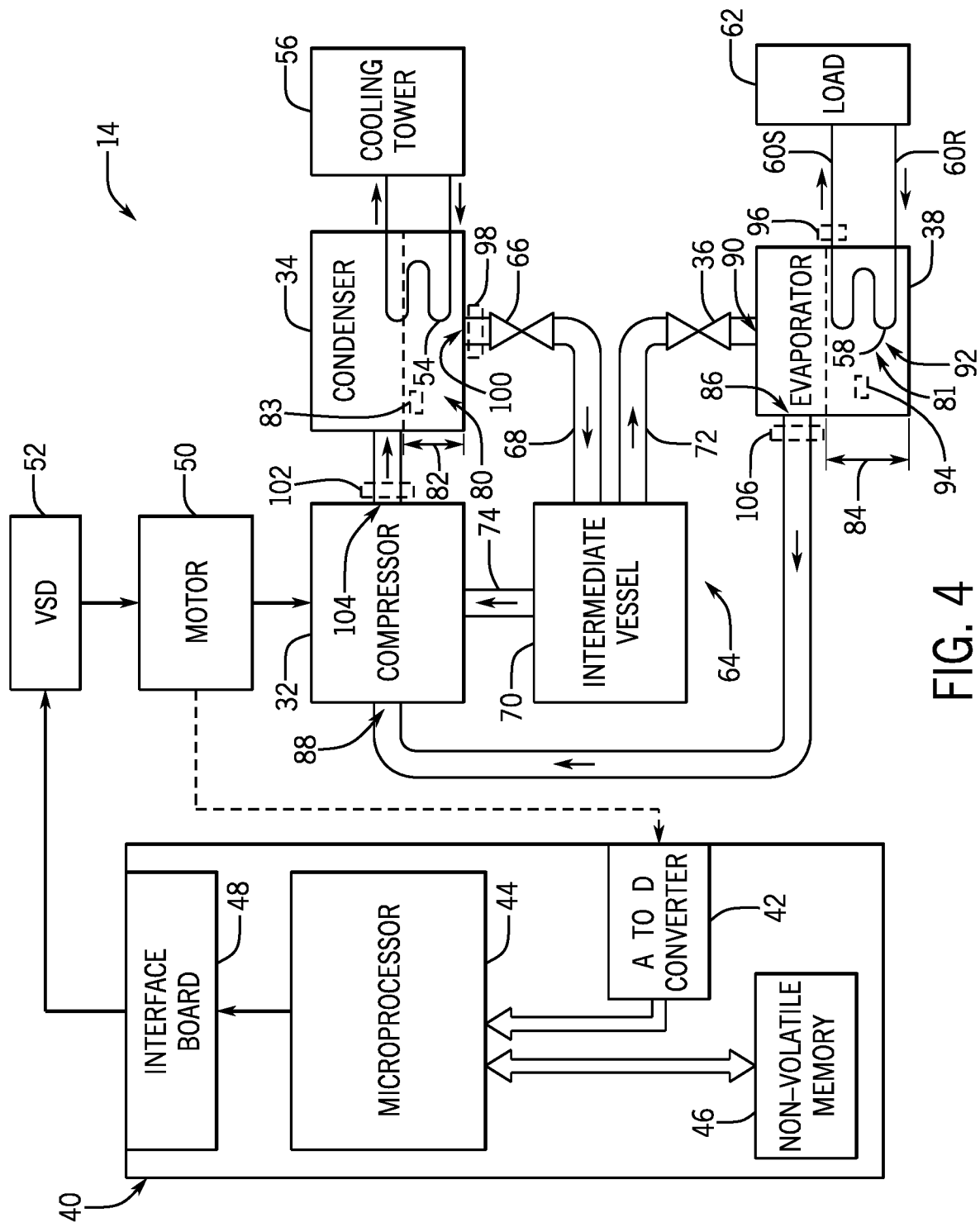
FIG. 4 is a schematic of an embodiment of the HVAC system of FIG. 2, in accordance with an aspect of the present disclosure.

FIG. 4 is a schematic of the vapor compression system 14 with an intermediate circuit 64 incorporated between condenser 34 and the expansion device 36. The intermediate circuit 64 may have an inlet line 68 that is directly fluidly connected to the condenser 34. In other embodiments, the inlet line 68 may be indirectly fluidly coupled to the condenser 34. As shown in the illustrated embodiment of FIG. 4, the inlet line 68 includes a first expansion device 66 positioned upstream of an intermediate vessel 70. In some embodiments, the intermediate vessel 70 may be a flash tank (e.g., a flash intercooler). In other embodiments, the intermediate vessel 70 may be configured as a heat exchanger or a "surface economizer." In the illustrated embodiment of FIG. 4, the intermediate vessel 70 is used as a flash tank, and the first expansion device 66 is configured to lower the pressure of (e.g., expand) the refrigerant liquid received from the condenser 34. During the expansion process, a portion of the liquid may vaporize, and thus, the intermediate vessel 70 may be used to separate the vapor from the liquid received from the first expansion device 66. Additionally, the intermediate vessel 70 may provide for further expansion of the refrigerant liquid because of a pressure drop experienced by the refrigerant liquid when entering the intermediate vessel 70 (e.g., due to a rapid increase in volume experienced when entering the intermediate vessel 70). The vapor in the intermediate vessel 70 may be drawn by the compressor 32 through a suction line 74 of the compressor 32, or through a centrifugal compressor. In other embodiments, the vapor in the intermediate vessel may be drawn to an intermediate stage of the compressor 32 (e.g., not the suction stage). The liquid that collects in the intermediate vessel 70 may be at a lower enthalpy than the refrigerant liquid exiting the condenser 34 because of the expansion in the expansion device 66 and/or the intermediate vessel 70. The liquid from intermediate vessel 70 may then flow in line 72 through a second expansion device 36 to the evaporator 38.

The vapor compression system 14 includes a refrigerant charge that is introduced into the system at installation, and this refrigerant charge is distributed throughout the vapor compression system 14 as refrigerant liquid, refrigerant vapor, and mixtures thereof, during operation. Referring to again to FIG. 3, a substantial portion of the liquid refrigerant in the illustrated vapor compression system 14 is disposed in either the condenser 34 or in the evaporator 38 during operation. As such, it may be appreciated that, for such embodiments, decreasing an amount of liquid refrigerant 80 present in the condenser 34 (as indicated by the liquid refrigerant level 82 of the condenser 34) generally increases an amount of liquid refrigerant 81 present in the evaporator 38 (as indicated by the liquid refrigerant level 84 of the evaporator 38), and vice versa. By way of further example, referring to FIG. 4, a substantial portion of the liquid refrigerant is disposed in the condenser 34, in the intermediate vessel 70, or in the evaporator 38. It may be appreciated that, for such embodiments, the amount of liquid refrigerant in the intermediate vessel 70 may controlled to a fixed liquid refrigerant level. As such, for the vapor compression system 14 of FIG. 4, decreasing the liquid refrigerant level 82 also generally increases the liquid refrigerant level 84 of the evaporator 38, and vice versa. The vapor compression system 14 of FIG. 3 includes a sensor 83 (e.g., a liquid level sensor) that is configured to measure the liquid refrigerant level 82 in the condenser 34, as discussed below. As mentioned, in other embodiments, the evaporator 38 may also include a similar liquid refrigerant level sensor.

As mentioned, in many traditional chiller designs, the liquid refrigerant level 82 in the condenser 34 is controlled to a predetermined fixed value. However, the performance of the vapor compression system 14 is substantially dependent on the distribution of liquid refrigerant between the condenser 34 and evaporator 38. In particular, when the liquid refrigerant level in the evaporator 38 (as indicated by the liquid refrigerant level 84) is too low, then boiling tubes of the tube bundle 58 (e.g., disposed in a flooded section of the evaporator 38) may not be effectively covered by liquid refrigerant, limiting the amount of heat that can be transferred from the load 62. Additionally, when the liquid refrigerant level 84 in the evaporator 38 is too high, then liquid refrigerant that has not been sufficiently vaporized can carry over from a vapor refrigerant outlet 86 of the evaporator to a vapor inlet 88 of the compressor 32, reducing efficiency of the vapor compression system 14 and potentially damaging the compressor 32. When the liquid refrigerant level 82 in the condenser 34 is too low, then refrigerant vapor may be undesirably entrained in the liquid refrigerant delivered to an inlet 90 of the evaporator 38, substantially reducing the efficiency of the evaporator 38 and the vapor compression system 14. Furthermore, when the liquid refrigerant level 82 in the condenser 34 is too high, then the liquid refrigerant level 84 in the evaporator 38 may not be sufficient to effectively cover boiling tubes of the tube bundle 58 disposed in a flooded portion 92 of the evaporator 38.

With the foregoing in mind, present embodiments are directed to systems and methods for continuously redistributing an amount of liquid refrigerant between the evaporator and the condenser of the chiller system in order to improve chiller efficiency during operation, and to limit (e.g., block, prevent) the aforementioned liquid carry over and gas entrainment issues. More specifically, the control panel 40 may monitor parameters and conditions of the vapor compression system 14 and provide suitable control signals to increase or decrease the liquid refrigerant level 82 in the condenser 34 or the evaporator 38 based on parameters and conditions of the system 14. As such, the control panel 40 may determine a liquid refrigerant level set point in the condenser 34 or the evaporator 38 based on the monitored parameters and conditions of the system 14, and may provide suitable control signals (e.g., to the expansion devices 36 and 66, to the compressor 32) to increase or decrease the liquid refrigerant level 82 to reach the determined liquid refrigerant level set point. As mentioned, the liquid refrigerant level set point of the condenser 34 or the evaporator 38 has a dynamic value that is determined by the control panel 40 based on one or more parameters of the vapor compression system 14 and/or other portions of the HVAC system 10 during operation. For example, these parameters may include measured parameters of the vapor compression system 14 (e.g., temperature, pressure, flow rate, power) and/or parameters that are calculated based on measured parameters of the HVAC system 10, and combinations thereof.

In particular, in certain embodiments, the parameters of the vapor compression system 14 may include evaporator approach temperature, which is defined as a difference between the temperature of liquid water leaving the tube bundle 58 of the evaporator 38 and the temperature of liquid refrigerant 81 in the evaporator 38. The illustrated vapor compression system 14 includes a first sensor 94 (e.g., a temperature sensor) disposed in the evaporator 38 that is configured to measure the temperature of the liquid refrigerant 81 in the evaporator, and includes a second sensor 96 (e.g., a temperature sensor) that is configured to measure the temperature of the liquid water leaving the tube bundle 58. It may be noted that, in other embodiments, the evaporator 38 may additionally or alternatively include a liquid level sensor and the parameters of the vapor compression system 14 may include a liquid level of the evaporator 38, as discussed below. Sensors 94 and 96, as well as the sensors described below, are communicatively coupled to the control panel 40 to provide the microprocessor 44 of the control panel 40 with measured parameters of the vapor compression system 14, such that the control panel 40 can modify the refrigerant liquid level set point in the condenser 34 or the evaporator 38 based on these measured parameters. In general, it is desirable for the evaporator approach temperature to be as small as possible to reduce energy expenditure and improve chiller efficiency. When the evaporator approach temperature exceeds a predetermined evaporator approach temperature threshold (e.g., 2° F., 3° F., 5° F.), which may be indicative of an increase in the cooling demand by the load 62, then the control panel 40 may decrease the liquid refrigerant level set point in the condenser 34 (or increase the liquid refrigerant level set point in the evaporator 38) to increase the amount of liquid refrigerant being delivered to the evaporator 38.

In certain embodiments, the parameters of the vapor compression system 14 may include an amount of liquid subcooling in the vapor compression system 14, which is defined as a difference between a measured temperature and a calculated saturation temperature of refrigerant exiting the condenser 34. For example, in the illustrated embodiments, the vapor compression system 14 includes a temperature and pressure sensor 98 positioned near the liquid refrigerant outlet 100 of the condenser 34, and the control panel 40 may determine the saturation temperature of the refrigerant based on a measured pressure of the liquid refrigerant near the liquid refrigerant outlet 100 of the condenser 34, and then compare this saturation temperature to a measured temperature of the liquid refrigerant at the liquid refrigerant outlet 100 of the condenser 34 to determine the amount of subcooling. In general, it is desirable for the amount of subcooling to be substantially constant during operation of the vapor compression system 14. As such, when the control panel 40 determines that the amount of subcooling in the vapor compression system 14 decreases below a predetermined minimum subcooling threshold, it may increase the refrigerant liquid level set point in the condenser 34 (or decrease the refrigerant liquid level set point in the evaporator 38) to restore the amount of subcooling to greater than or equal to the minimum subcooling threshold. When the control panel 40 determines that the amount of subcooling has increased beyond a predetermined maximum subcooling threshold, it may decrease the refrigerant liquid level set point in the condenser 34 (or increase the refrigerant liquid level set point in the evaporator 38) to reduce the amount of subcooling to less than or equal to the predetermined maximum subcooling threshold, reducing energy consumption and improving efficiency of the vapor compression system 14.

In certain embodiments, the monitored parameters of the vapor compression system 14 may include an amount of discharge superheat in the vapor compression system 14, which is defined as a difference between a measured temperature and a calculated saturation temperature of refrigerant exiting the compressor 32. For example, in certain embodiments, the vapor compression system 14 include a sensor 102 (e.g., a temperature and pressure sensor) positioned near a refrigerant outlet 104 of the compressor 32, and the control panel 40 may determine the saturation temperature of the refrigerant based on a measured pressure of the refrigerant near the refrigerant outlet 104 of the compressor 32. The control panel 40 then compares the calculated saturation temperature to a measured refrigerant temperature also collected by the sensor 102. In general, it is desirable for the amount of discharge superheat to be substantially constant during operation of the vapor compression system 14. Furthermore, it is presently recognized that discharge superheat significantly drops as refrigerant liquid begins to undesirably carry over to the compressor 32 from the evaporator 38. As such, when the control panel 40 determines that the amount of discharge superheat has decreased below a predetermined discharge superheat threshold (e.g., a lower discharge superheat threshold), the control panel 40 may increase the refrigerant liquid level set point in the condenser 34 (or decrease the refrigerant liquid level set point in the evaporator 38) to reduce the amount of liquid refrigerant in the evaporator 38, and thereby reduce (e.g., block, prevent) refrigerant liquid carry over to the compressor 32. Similarly, when the control panel 40 determines that the amount of discharge superheat has increased above a predetermined discharge superheat threshold (e.g., an upper discharge superheat threshold), the control panel 40 may decrease the refrigerant liquid level set point in the condenser 34 (or increase the refrigerant liquid level set point in the evaporator 38), for example, to maintain the discharge superheat between the predetermined minimum discharge superheat threshold and the predetermined maximum discharge superheat threshold values. In other embodiments, a sensor 106 (e.g., a liquid refrigerant sensor, a liquid carry over sensor) may, additionally or alternatively, be positioned near the vapor refrigerant outlet 86 of the evaporator 38 and configured to detect the presence of liquid refrigerant as an indication of liquid refrigerant carry over.

In certain embodiments, the monitored parameters of the vapor compression system 14 may include an amount of power consumed by the compressor 32 of the vapor compression system 14. Since the operation of the compressor 32 represents a substantial portion of the total power consumed by the vapor compression system 14, it is generally desirable for the power consumption of the compressor 32 to be minimized to maximize efficiency of the system 14. As such, in certain embodiments, a measure of the operational efficiency of the vapor compression system 14 may be determined based on the power consumption by the compressor 32 during operation of the vapor compression system 14. Therefore, in certain embodiments, the control panel 40 may control the liquid refrigerant level set point of the condenser 34 or the evaporator 38 in a manner that minimizes power consumed by the compressor 32, while also reducing (e.g., blocking, preventing) refrigerant liquid carry over to the compressor 32 and/or refrigerant vapor entrainment in the refrigerant delivered to the evaporator 38.

In certain embodiments, the control panel 40 may vary a liquid refrigerant level set point of the condenser 34 or the evaporator 38 based at least one the parameters of the vapor compression system 14 discussed herein, or combinations thereof. For example, one embodiment of the vapor compression system 14 may vary the liquid refrigerant level 82 in the condenser 34 or the evaporator 38 by more than 2%, more than 5%, more than 8%, or by 10% or more of an internal refrigerant volume of the condenser 34 or the evaporator 38. By way of specific example, when approximately 50% of the internal refrigerant volume of the condenser 34 is initially filled with liquid refrigerant upon activation of the vapor compression system 14, between approximately 40% and approximately 60% of the internal refrigerant volume of the condenser 34 may be filled with liquid refrigerant at different times, depending on the parameters and conditions of the vapor compression system 14, during operation.

The control panel 40 increases the refrigerant liquid level set point of the condenser 34 (or decreases the refrigerant liquid level set point in the evaporator 38) based on a combination of parameters and conditions of the vapor compression system 14 during operation. For example, in certain embodiments, the control panel 40 increases the liquid refrigerant level set point in the condenser 34 (or decreases the refrigerant liquid level set point in the evaporator 38) in response to determining that the liquid refrigerant level 82 in the condenser 34 is below a predetermined minimum condenser liquid refrigerant level. In particular, the predetermined minimum condenser liquid refrigerant level may be selected to prevent the liquid refrigerant level 82 in the condenser 34 from dropping sufficiently low to allow a substantial amount of refrigerant vapor to be entrained in the liquid refrigerant 80 exiting the condenser 34. In certain embodiments, the control panel 40 also increases the liquid refrigerant level set point in the condenser 34 (or decreases the refrigerant liquid level set point in the evaporator 38) in response to determining that liquid refrigerant is starting to carry over from the evaporator 38 to the compressor 32. As mentioned, the control panel 40 may determine the occurrence of liquid carry over via the sensor 102 disposed near the outlet of the compressor 32 and/or via the liquid refrigerant sensor 106 disposed between the evaporator 38 and the compressor 32. In certain embodiments, the control panel 40 also increases the liquid refrigerant level set point in the condenser 34 (or decreases the refrigerant liquid level set point in the evaporator 38) in response to determining that the subcooling of the vapor compression system 14 is below a predetermined minimum liquid subcooling threshold.

The control panel 40 also decreases the refrigerant liquid level set point of the condenser 34 (or increases the refrigerant liquid level set point in the evaporator 38) based on a combination of parameters and conditions of the vapor compression system 14 during operation. For example, in certain embodiments, the control panel 40 may maximize efficiency of the vapor compression system 14 by decreasing the refrigerant liquid level set point of the condenser 34 to a relative minimum value (or increasing the refrigerant liquid level set point in the evaporator 38 to a relative maximum value), wherein this minimum/maximum value is sufficient to prevent in issues with liquid refrigerant carry over or gas entrainment in liquid refrigerant described above. In certain embodiments, the control panel 40 also decreases the liquid refrigerant level set point in the condenser 34 (or increases the refrigerant liquid level set point in the evaporator 38) in response to determining that the evaporator approach temperature is greater than a predetermined maximum evaporator approach temperature. For example, an increase in the evaporator approach temperature may be indicative of an increased cooling demand by the load 62, and decreasing the refrigerant liquid level set point in the condenser 34 (or increasing the refrigerant liquid level set point in the evaporator 38 to accommodate this increased demand, while still avoiding the aforementioned issues with liquid carry over and gas entrainment. In certain embodiments, the control panel 40 also decreases the liquid refrigerant level set point in the condenser 34 (or increases the refrigerant liquid level set point in the evaporator 38) in response to determining that the subcooling of the vapor compression system 14 is greater than a predetermined maximum liquid subcooling threshold. In certain embodiments, the control panel 40 also decreases the liquid refrigerant level set point in the condenser 34 (or increases the refrigerant liquid level set point in the evaporator 38) to reduce power consumption of the compressor 32. For example, by decreasing the liquid refrigerant level set point in the condenser 34 to a relative minimum value (or increasing the refrigerant liquid level set point in the evaporator 38 to a relative maximum value) that does not result in the aforementioned issues with liquid carry over or gas entrainment, the control panel 40 can reduce power consumption by the compressor 32 and, thereby, improve efficiency of the vapor compression system 14 and the HVAC unit 10. In particular, it is believed that the presently disclosed control strategy can improve operational efficiency of the vapor compression system by between approximately 5% and 10%, representing a substantial savings in operational costs.

Figure 5:
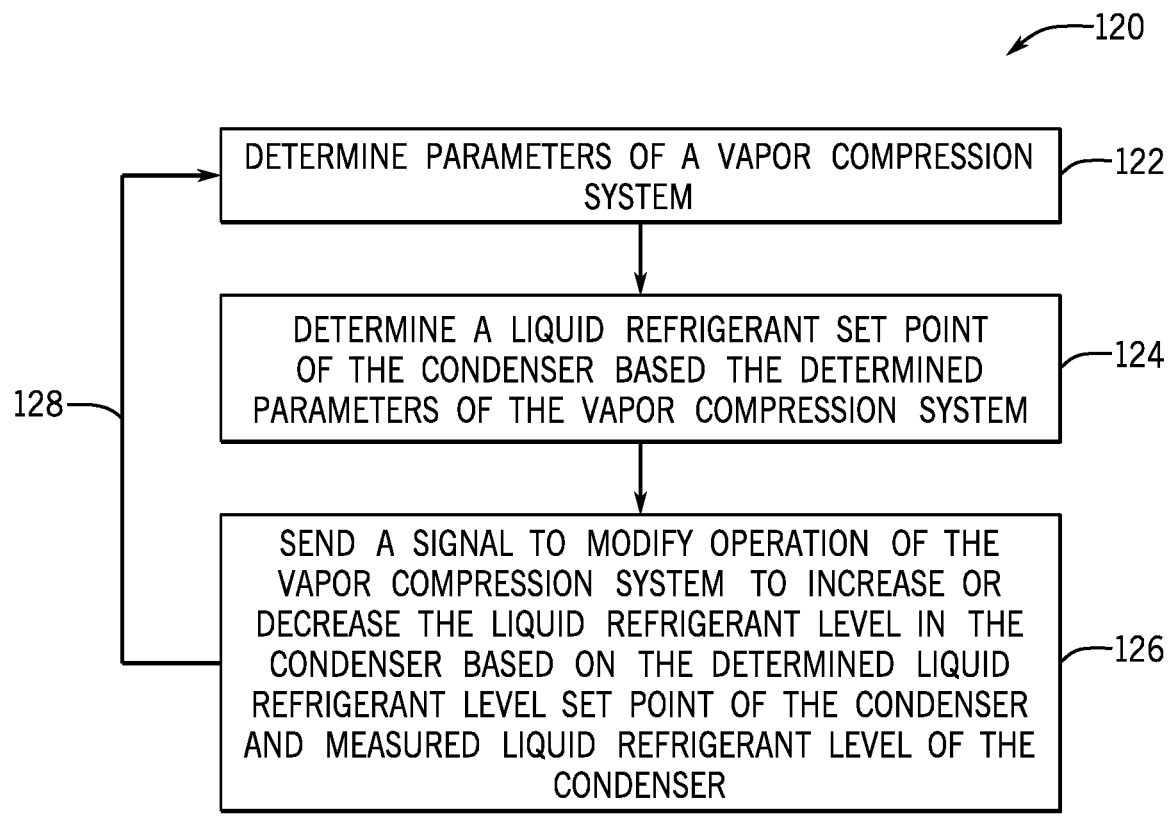
FIG. 5 is a flow diagram of an embodiment of a process for dynamically controlling a liquid refrigerant level of a condenser of the HVAC system based the operational parameters of the vapor compression system, in accordance with an aspect of the present disclosure.

FIG. 5 is a flow diagram illustrating an embodiment of a process 120 for dynamically controlling the liquid refrigerant level 82 of a condenser 34 of the vapor compression system 14 based parameters of the vapor compression system during operation. The illustrated process 120 may be stored as computer-readable instructions in non-volatile memory 46 and executed by microprocessor 44 of the control panel 40, or another suitable processing or control circuitry. In other embodiments, the illustrated steps of the process 120 may be skipped, repeated, or performed in other orders, in accordance with the present disclosure.

The illustrated process 120 begins with the control panel 40 determining (block 122) parameters of the vapor compression system 14. As discussed, the vapor compression system 14 may include any number of suitable sensors, including liquid level sensors, temperature sensors, pressure sensors, and so forth, that are communicatively coupled to the control panel 40. In particular, the control panel 40 receives measurements from the liquid level sensor 83 of the condenser 34 indicating a current refrigerant liquid level 82 in the condenser 34. Additionally, the control panel 40 may determine any suitable parameters of the vapor compression system 14, such as subcooling, discharge superheat, and evaporator approach temperature, based on measurements received from the various sensor of the vapor compression system 14, as discussed.

The illustrated process 120 continues with the control panel 40 determining (block 124) a liquid refrigerant level set point of the condenser 34 of the vapor compression system 14 based on the parameters of the vapor compression system 14 determined in block 122. That is, based on the current refrigerant liquid level 82 in the condenser 34 and the determined operational parameters of the vapor compression system 14, the control panel 40 may determine that the liquid refrigerant level 82 in the condenser 34 should be increased or decreased. As mentioned, in addition to reducing liquid carry over and gas entrainment, the control panel 40 may minimize power consumption of the vapor compression system 14 to a relative minimum while still meeting the cooling demands of the load 62. In particular, as mentioned, the control panel 40 ensures that the liquid refrigerant level 82 does not drop below a predetermined minimum refrigerant level threshold to prevent gas entrainment issues.

The illustrated process 120 continues with the control panel 40 sending (block 126) a signal to modify operation of the vapor compression system 14 to increase or decrease the liquid refrigerant level 82 in the condenser 34, based on the liquid refrigerant level set point determined in block 124 and the measured liquid refrigerant level 82 determined in block 122. In particular, the control panel 40 may provide control signals to increase or decrease the speed of the compressor and/or provide control signals to increase or decrease the flow through the expansion devices 36 and 66 to modify the liquid refrigerant level 82 in the condenser 34. As indicated by the arrow 128, the control panel 40 may repeat the steps of blocks 122, 124, and 126, to continuously monitor and modify the liquid refrigerant level 82 in the condenser 34 based on the changing parameters of the vapor compression system 14 and the changing cooling demand of the load 62.

Figure 6:
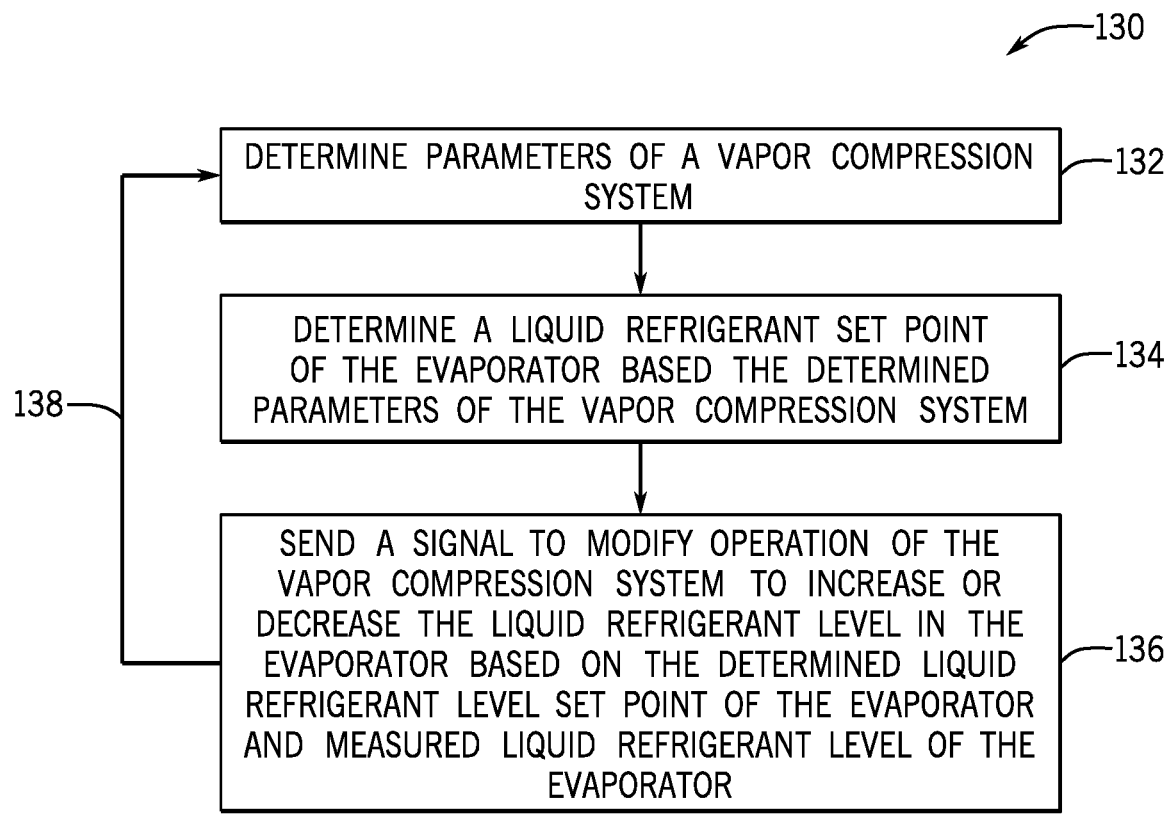
FIG. 6 is a flow diagram of an embodiment of a process for dynamically controlling a liquid refrigerant level of an evaporator of the HVAC system based the operational parameters of the vapor compression system, in accordance with an aspect of the present disclosure.

FIG. 6 is a flow diagram illustrating an embodiment of a process 130 for dynamically controlling the liquid refrigerant level 84 of the evaporator 38 of the vapor compression system 14 based parameters of the vapor compression system 14 during operation. The illustrated process 130 may be stored as computer-readable instructions in non-volatile memory 46 and executed by microprocessor 44 of the control panel 40, or another suitable processing or control circuitry. In other embodiments, the illustrated steps of the process 130 may be skipped, repeated, or performed in other orders, in accordance with the present disclosure.

The illustrated process 130 begins with the control panel 40 determining (block 132) parameters of the vapor compression system 14. As discussed, the vapor compression system 14 may include any number of suitable sensors, including liquid level sensors, temperature sensors, pressure sensors, and so forth, that are communicatively coupled to the control panel 40. In particular, the control panel 40 receives measurements from a liquid level sensor of the evaporator 38 indicating a current refrigerant liquid level 84 in the evaporator 38. Additionally, the control panel 40 may determine any suitable parameters of the vapor compression system 14, such as subcooling, discharge superheat, and evaporator approach temperature, based on measurements received from the various sensor of the vapor compression system 14, as discussed.

The illustrated process 130 continues with the control panel 40 determining (block 134) a liquid refrigerant level set point of the evaporator 38 of the vapor compression system 14 based on the parameters of the vapor compression system 14 determined in block 132. That is, based on the current refrigerant liquid level 84 in the evaporator 38 and the determined operational parameters of the vapor compression system 14, the control panel 40 may determine that the liquid refrigerant level 84 in the evaporator 38 should be increased or decreased. As mentioned, in addition to reducing liquid carry over and gas entrainment, the control panel 40 may minimize power consumption of the vapor compression system 14 to a relative minimum while still meeting the cooling demands of the load 62. In particular, as mentioned, the control panel 40 ensures that the liquid refrigerant level 82 in the condenser 34 does not drop below a predetermined minimum refrigerant level threshold to mitigate, reduce, or prevent gas entrainment issues.

The illustrated process 130 continues with the control panel 40 sending (block 136) a signal to modify operation of the vapor compression system 14 to increase or decrease the liquid refrigerant level 84 in the evaporator 38, based on the liquid refrigerant level set point determined in block 134 and the measured liquid refrigerant level 84 determined in block 132. In particular, the control panel 40 may provide control signals to increase or decrease the speed of the compressor 32 and/or provide control signals to increase or decrease the flow through the expansion devices 36 and 66 to modify the liquid refrigerant level 84 in the evaporator 38. As indicated by the arrow 138, the control panel 40 may repeat the steps of blocks 132, 134, and 136, to continuously monitor and modify the liquid refrigerant level 84 in the evaporator 38 based on the changing parameters of the vapor compression system 14 and the changing cooling demand of the load 62.

Technical effects of the present disclosure include enabling the manufacture of vapor compression systems having control circuitry that is configured to dynamically adjust the liquid refrigerant level set point in the condenser or the evaporator to enable improved chiller efficiency without diminished reliability. For example, the liquid refrigerant level set point may be adjusted to increase the efficiency of the chiller (e.g., reduce compressor power consumption) without reduced reliability as a result of liquid carry over from the evaporator to the compressor or gas entrainment in liquid refrigerant delivered from the condenser to the evaporator. The liquid refrigerant level set point of the condenser or the evaporator may be determined by the control circuitry based on mathematical models, may be apriori based on testing various conditions, or may be based on a combination of mathematical modeling and testing, in accordance with the present disclosure.

While only certain features and embodiments have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A heating, ventilation, and air conditioning (HVAC) system, comprising:
   a condenser, an evaporator, and a compressor fluidly coupled together to form a vapor compression system of the HVAC system;
   an expansion device disposed between the condenser and the evaporator in the vapor compression system;
   a control panel communicatively coupled to the expansion device, wherein the control panel is configured to:
      determine a liquid refrigerant level set point of the condenser based on parameters of the vapor compression system, wherein the parameters comprise a current liquid refrigerant level in the condenser;
      provide a first control signal to increase an opening of the expansion device in response to determining that the current liquid refrigerant level in the condenser is greater than the determined liquid refrigerant level set point of the condenser; and
      provide a second control signal to decrease the opening of the expansion device in response to determining that the current liquid refrigerant level in the condenser is less than the determined liquid refrigerant level set point of the condenser.

2. The HVAC system of claim 1, wherein, to determine the liquid refrigerant level set point, the control panel is configured to:
   determine an evaporator approach temperature of the vapor compression system; and
   decrease the liquid refrigerant level set point of the condenser in response to the evaporator approach temperature being greater than a predetermined maximum evaporator approach temperature.

3. The HVAC system of claim 1, wherein, to determine the liquid refrigerant level set point, the control panel is configured to:
   determine an amount of subcooling of the vapor compression system; and
   decrease the liquid refrigerant level set point of the condenser in response to the amount of subcooling being greater than a predetermined maximum subcooling threshold.

4. The HVAC system of claim 3, wherein, to determine the liquid refrigerant level set point of the condenser, the control panel is configured to:
   increase the liquid refrigerant level set point of the condenser in response to the amount of subcooling being less than a predetermined minimum subcooling threshold.

5. The HVAC system of claim 1, wherein, to determine the liquid refrigerant level set point of the condenser, the control panel is configured to:
   determine a discharge superheat of the vapor compression system; and
   increase the liquid refrigerant level set point of the condenser in response to the discharge superheat being less than a predetermined minimum discharge superheat threshold.

6. The HVAC system of claim 5, wherein, to determine the liquid refrigerant level set point of the condenser, the control panel is configured to:
   decrease the liquid refrigerant level set point of the condenser in response to the discharge superheat being greater than a predetermined maximum discharge superheat threshold.

7. The HVAC system of claim 1, comprising a liquid carry over sensor disposed between the evaporator and the compressor of the vapor compression system and communicatively coupled to the control panel of the vapor compression system, wherein the control panel is configured to:
   increase the liquid refrigerant level set point of the condenser in response to the liquid carry over sensor detecting liquid carry over between the evaporator and the compressor of the vapor compression system.

8. A method of operating a vapor compression system, comprising:
   determining a liquid refrigerant level set point of a condenser of the vapor compression system based on parameters of the vapor compression system, wherein the parameters comprise a current liquid refrigerant level in the condenser;
   providing a first control signal to increase an opening of an expansion device of the vapor compression system in response determining that the current liquid refrigerant level in the condenser is greater than the determined liquid refrigerant level set point of the condenser; and
   providing a second control signal to decrease the opening of the expansion device in response to determining that the current liquid refrigerant level in the condenser is less than the determined liquid refrigerant level set point of the condenser.

9. The method of claim 8, wherein determining the liquid refrigerant level set point of the condenser comprises:
   measuring an evaporator approach temperature of the vapor compression system; and
   decreasing the liquid refrigerant level set point of the condenser in response to the evaporator approach temperature being greater than a predetermined maximum evaporator approach temperature.

10. The method of claim 8, wherein determining the liquid refrigerant level set point of the condenser comprises:
   measuring a temperature and a pressure of liquid refrigerant exiting the condenser;

determining a calculated saturation temperature of the liquid refrigerant based on the measured pressure of the liquid refrigerant exiting the condenser; and determining an amount of subcooling of the vapor compression system based on a difference between the measured temperature of the liquid refrigerant exiting the condenser and the calculated saturation temperature of the liquid refrigerant.

11. The method of claim 10, wherein determining the liquid refrigerant level set point of the condenser comprises:

decreasing the liquid refrigerant level set point of the condenser in response to the determined amount of subcooling being greater than a predetermined maximum subcooling threshold; and increasing the liquid refrigerant level set point of the condenser in response to the determined amount of subcooling being less than a predetermined minimum subcooling threshold.

12. The method of claim 8, wherein determining the liquid refrigerant level set point of the condenser comprises:

measuring a temperature and a pressure of refrigerant exiting a compressor of the vapor compression system;

determining a calculated saturation temperature of the refrigerant based on the measured pressure of the refrigerant exiting the compressor; and determining a discharge superheat of the vapor compression system based on a difference between the measured temperature of the refrigerant exiting the compressor and the calculated saturation temperature of the refrigerant.

13. The method of claim 12, wherein determining the liquid refrigerant level set point of the condenser comprises:

increasing the liquid refrigerant level set point of the condenser in response to the discharge superheat being less than a predetermined minimum discharge superheat threshold; and decreasing the liquid refrigerant level set point of the condenser in response to the discharge superheat being greater than a predetermined maximum discharge superheat threshold.

14. The method of claim 8, wherein determining the liquid refrigerant level set point of the condenser comprises:

increasing the liquid refrigerant level set point of the condenser in response to detecting liquid carry over between an evaporator and a compressor of the vapor compression system.

15. A heating, ventilation, and air conditioning (HVAC) system, comprising:

a condenser, an evaporator, and a compressor fluidly coupled together to form a vapor compression system of the HVAC system;

an expansion device disposed between the condenser and the evaporator in the vapor compression system;

a control panel communicatively coupled to the expansion device, wherein the control panel is configured to:

determine a liquid refrigerant level set point of the evaporator based on parameters of the vapor compression system, wherein the parameters comprise a current liquid refrigerant level in the evaporator;

provide a first control signal to increase an opening of the expansion device in response determining that the current liquid refrigerant level in the evaporator is lower than the determined liquid refrigerant level set point of the evaporator; and provide a second control signal to decrease the opening of the expansion device in response to determining that the current liquid refrigerant level in the evaporator is more than the determined liquid refrigerant level set point of the evaporator.

16. The HVAC system of claim 15, wherein, to determine the liquid refrigerant level set point of the evaporator, the control panel is configured to:

determine an evaporator approach temperature of the vapor compression system; and increase the liquid refrigerant level set point of the evaporator in response to the evaporator approach temperature being greater than a predetermined maximum evaporator approach temperature.

17. The HVAC system of claim 15, wherein, to determine the liquid refrigerant level set point of the evaporator, the control panel is configured to:

determine an amount of subcooling of the vapor compression system; and increase the liquid refrigerant level set point of the evaporator in response to the amount of subcooling being greater than a predetermined maximum subcooling threshold.

18. The HVAC system of claim 17, wherein, to determine the liquid refrigerant level set point of the evaporator, the control panel is configured to:

decrease the liquid refrigerant level set point of the evaporator in response to the amount of subcooling being less than a predetermined minimum subcooling threshold.

19. The HVAC system of claim 15, wherein, to determine the liquid refrigerant level set point of the evaporator, the control panel is configured to:

determine a discharge superheat of the vapor compression system;

decrease the liquid refrigerant level set point of the evaporator in response to the discharge superheat being less than a predetermined minimum discharge superheat threshold; and increase the liquid refrigerant level set point of the evaporator in response to the discharge superheat being greater than a predetermined maximum discharge superheat threshold.

20. The HVAC system of claim 15, comprising a liquid carry over sensor disposed between the evaporator and the compressor of the vapor compression system and communicatively coupled to the control panel of the vapor compression system, wherein the control panel is configured to:

decrease the liquid refrigerant level set point of the evaporator in response to the liquid carry over sensor detecting liquid carry over between the evaporator and the compressor of the vapor compression system.

* * * * *